(12) United States Patent
White et al.

(10) Patent No.: US 8,601,508 B2
(45) Date of Patent: Dec. 3, 2013

(54) SYSTEM FOR PRESENTING AN ELECTRONIC PROGRAMMING GUIDE IN A SATELLITE COMMUNICATION SYSTEM

(75) Inventors: Scott White, Austin, TX (US); Ramsey Ksar, San Jose, CA (US)

(73) Assignees: AT&T Intellectual Property I, LP, Atlanta, GA (US); Yahoo! Inc., Sunnyvale, CA (US)

( * ) Notice: Subject to any disclaimer, the term of this patent is extended or adjusted under 35 U.S.C. 154(b) by 553 days.

(21) Appl. No.: 11/779,131

(22) Filed: Jul. 17, 2007

(65) Prior Publication Data

US 2009/0025036 A1 Jan. 22, 2009

(51) Int. Cl.
*G06F 3/00* (2006.01)
*G06F 13/00* (2006.01)
*H04N 5/445* (2011.01)

(52) U.S. Cl.
USPC ............ 725/39; 725/37; 725/38; 725/52; 725/80; 725/83; 725/105; 725/109

(58) Field of Classification Search
USPC .................... 725/37–39, 52, 80, 83
See application file for complete search history.

(56) References Cited

U.S. PATENT DOCUMENTS

| | | | | |
|---|---|---|---|---|
| 6,018,372 A * | 1/2000 | Etheredge | ............... | 725/44 |
| 7,069,573 B1 * | 6/2006 | Brooks et al. | ............... | 725/62 |
| 7,134,133 B1 | 11/2006 | Wugofski | | |
| 7,281,261 B2 * | 10/2007 | Jaff et al. | ............... | 725/132 |
| 2002/0124253 A1 * | 9/2002 | Eyer et al. | ............... | 725/34 |
| 2003/0070170 A1 * | 4/2003 | Lennon | ............... | 725/51 |
| 2004/0109197 A1 * | 6/2004 | Gardaz et al. | ............... | 358/1.15 |
| 2006/0002369 A1 * | 1/2006 | Dowker | ............... | 370/351 |
| 2006/0095472 A1 * | 5/2006 | Krikorian et al. | ............... | 707/104.1 |
| 2008/0271080 A1 * | 10/2008 | Gossweiler et al. | ............... | 725/47 |

* cited by examiner

*Primary Examiner* — Jeremy Duffield
(74) *Attorney, Agent, or Firm* — Guntin & Gust, PLC; Douglas Schnabel

(57) ABSTRACT

A system for presenting an electronic programming guide in a satellite communication system is disclosed. A system that incorporates teachings of the present disclosure may include, for example, a satellite media receiver having a controller element to transmit to a portal information associated with an Electronic Programming Guide (EPG). The portal can process the information to present a Graphical User Interface (GUI) window corresponding to a slideable canvas of the EPG in an Internet browser of a communication device requesting the EPG. Other embodiments are disclosed.

22 Claims, 11 Drawing Sheets

Portable Communication Devices

8,601,508 B2

SYSTEM FOR PRESENTING AN ELECTRONIC PROGRAMMING GUIDE IN A SATELLITE COMMUNICATION SYSTEM

FIELD OF THE DISCLOSURE

The present disclosure relates generally to media services and more specifically to a system for presenting an electronic programming guide in a satellite communication system.

BACKGROUND

Current implementations of Electronic Programming Guides (EPGs) are typically presented in a flat graphical user interface. Navigating through listings of media channels and their respective media programs in an EPG can be cumbersome. Consequently, some subscribers resort to navigating between media channels until they find a program of interest, which can be inefficient and frustrating.

A need therefore arises for a system for presenting an electronic programming guide in a satellite communication system.

DETAILED DESCRIPTION

Broadly stated, embodiments in accordance with the present disclosure provide a system for presenting an electronic programming guide in a satellite communication system.

In one embodiment of the present disclosure, a computer-readable storage medium in a portal can have computer instructions for receiving a request from a communication device to access an Electronic Programming Guide (EPG) by way of a satellite media receiver, establishing communications with the satellite media receiver by way of a gateway, receiving from the satellite media receiver information associated with the EPG, and presenting a Graphical User Interface (GUI) window corresponding to a slideable canvas of the EPG in an Internet browser of the communication device. The gateway can be coupled to a broadband port of the satellite media receiver by way of a Local Area Network (LAN) managed by the gateway. The satellite media receiver can have a satellite port for receiving satellite signals supplied by a satellite dish system. The satellite signals are associated with satellite media services of the satellite communication system.

In one embodiment of the present disclosure, a satellite media receiver can have a controller element to transmit to a portal information associated with an EPG. In another embodiment of the present disclosure, a gateway can have a controller element to provide the portal access to the EPG supplied by the satellite media receiver. In both embodiments the portal can process the information to present a GUI window corresponding to a slideable canvas of the EPG in an Internet browser of a communication device requesting the EPG.

Figure 1:
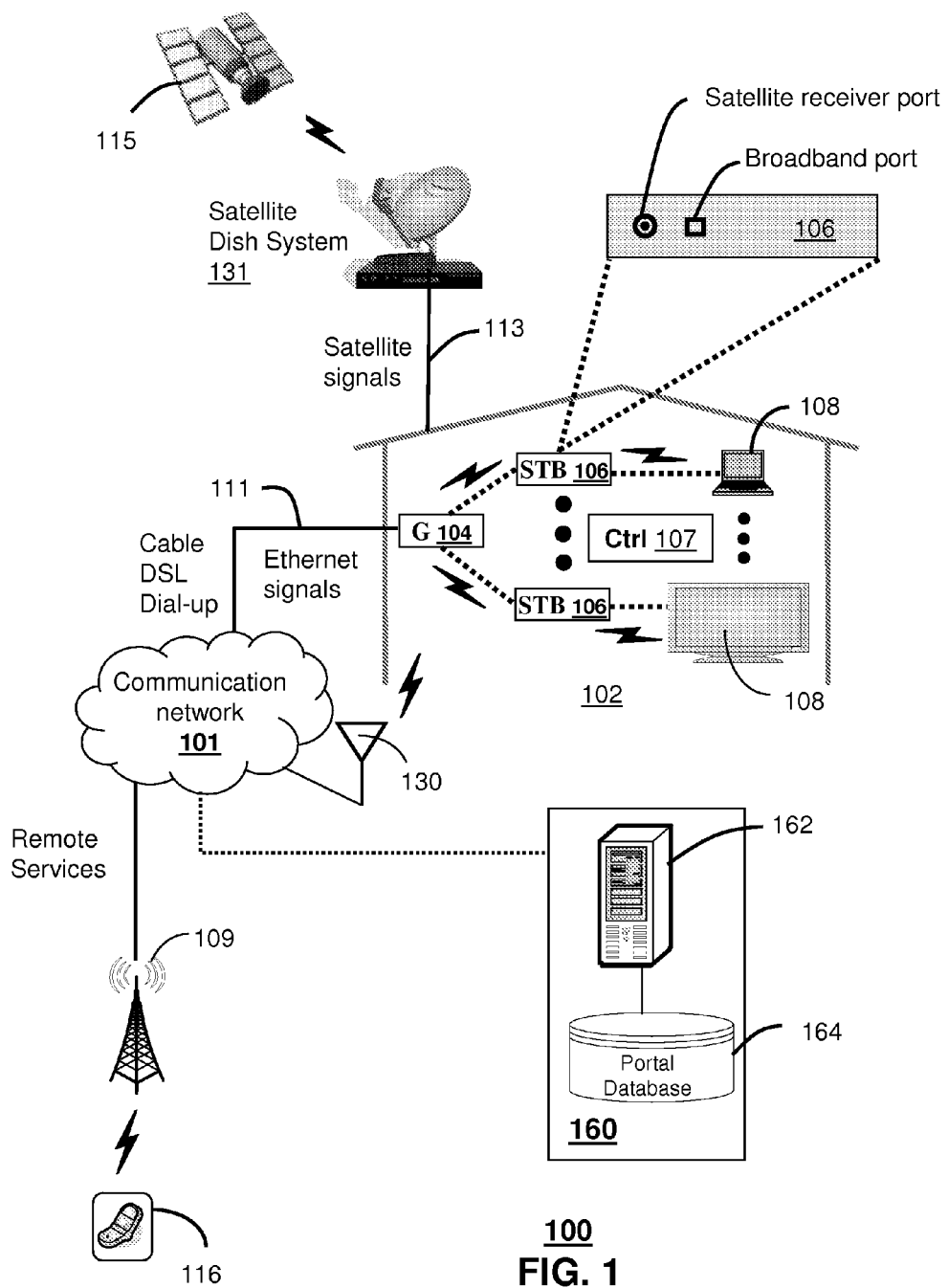
FIG. 1 depicts an exemplary embodiment of a satellite communication system.

FIG. 1 depicts an exemplary embodiment of a satellite communication system 100. The satellite communication system 100 can comprise a satellite dish system 131 that delivers multimedia satellite services from one or more satellites 115 to a residence or commercial establishment ("building") 102. A gateway 104 residing in building 102 can be used to distribute a portion of Ethernet signals 111 and satellite signals 113 to one or more satellite media receivers 106 such as satellite Set-Top Boxes (STBs) for presenting satellite multimedia services to media devices 108 such as a computer, cell phone, portable music player, or analog or digital television set (e.g., plasma TV). Alternatively, the satellite media receivers 106 can be coupled to the satellite dish system 131 and thereby receive the satellite signals 113 directly.

The satellite media receiver 106 can be supplied to subscribers by a satellite broadcast communications provider for purposes of delivering satellite media services to the media device 108. The delivery of satellite programs to the media devices 108 can be distributed by common wired (e.g., coax or optical cable) or wireless means. A media controller 107 such as a common remote controller can be used to control the satellite media receiver 106 and/or the media device 108. The media controller 107 can utilize common infrared or RF signaling technology to communicate with one or more of the aforementioned subsystems of the satellite communication system 100. The media controller 107 can also include a common display (e.g., LCD) for presenting a user interface (UI) for controlling operations of the satellite media receiver 106.

The satellite communication system 100 can utilize a portal 160 that can provide portal services to subscribers of the satellite communication system 100. The controller element 162 can utilize common computing technologies (e.g., desktop computer, server, etc.) to manage processing resources of the portal 160 and a mass storage system 164. The mass storage system 164 can utilize common storage technologies (e.g., hard disk drives, flash memory, etc.) to store data in one or more databases.

Figure 2:
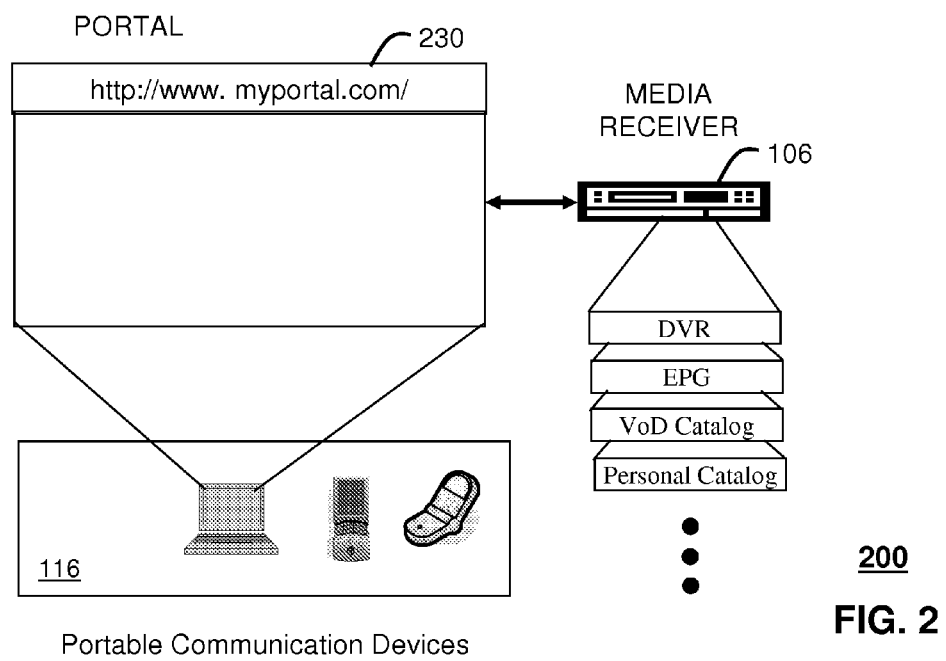
FIGS. 2-14 depict exemplary embodiments of a portal of the satellite communication system.

FIGS. 2-14 depict exemplary embodiments of a portal 230 of the communication system 100. In FIG. 2, the portal 230 can be accessed by a URL with a common browser such as Microsoft's Internet Explorer. The portal 230 can be configured to access a satellite media receiver 106 such as the STB of FIG. 1 to retrieve information associated with an Electronic Programming Guide (EPG). FIGS. 3-14 depict embodiments of a GUI window presented by the portal 230 at the Internet browser for navigating through an EPG. The GUI window of FIGS. 3-14 illustrate a slideable canvas with a matrix depicting a plurality of media program channel IDs and call letters in a first column and corresponding media programs for each media program channel and their viewing times in rows.

The slideable canvas of the EPG can have a virtual view that is larger than the GUI window presented at the Internet browser. In this embodiment, the slideable canvas of the EPG can have more viewable data (e.g., weeks of media programs and their respective viewing times) than is presented by the GUI window. The GUI window in a sense acts as a virtual compass into the slideable canvas of the EPG. As the slideable canvas is panned in a particular direction the GUI window presents a different viewable portion of the EPG that was previously hidden.

A number of GUI control elements can be placed in borders of the GUI window to control the portion of the EPG presented in the GUI window. For example, the GUI window can have GUI control elements such as pan right and pan left GUI buttons for panning the slideable canvas to the left and right respectively (see FIGS. 3-4), pan up and pan down GUI buttons for panning the slideable canvas down and up respectively (see FIGS. 5-6). Alternatively, or in combination, the slideable canvas of the EPG can be panned in any direction by selecting and dragging the slideable canvas by way of a navigation element of the portable communication device 116. The navigation element can be for example a mouse with selection buttons, a disk or roller ball with selection features.

To pan in any direction, a navigation arrow or other symbol (e.g., a pointing finger of a hand) can be directed by common navigation means to a point in the portion of slideable canvas of the EPG exposed by the GUI window. Said location is then selected by the navigation element (e.g., depressing a mouse selection button). While holding down the selection button the slideable canvas can be moved within the confines of the GUI window in any direction of interest by the subscriber (much like the way maps are panned today in portals such as maps.google.com or mapquest.com).

Figure 7:
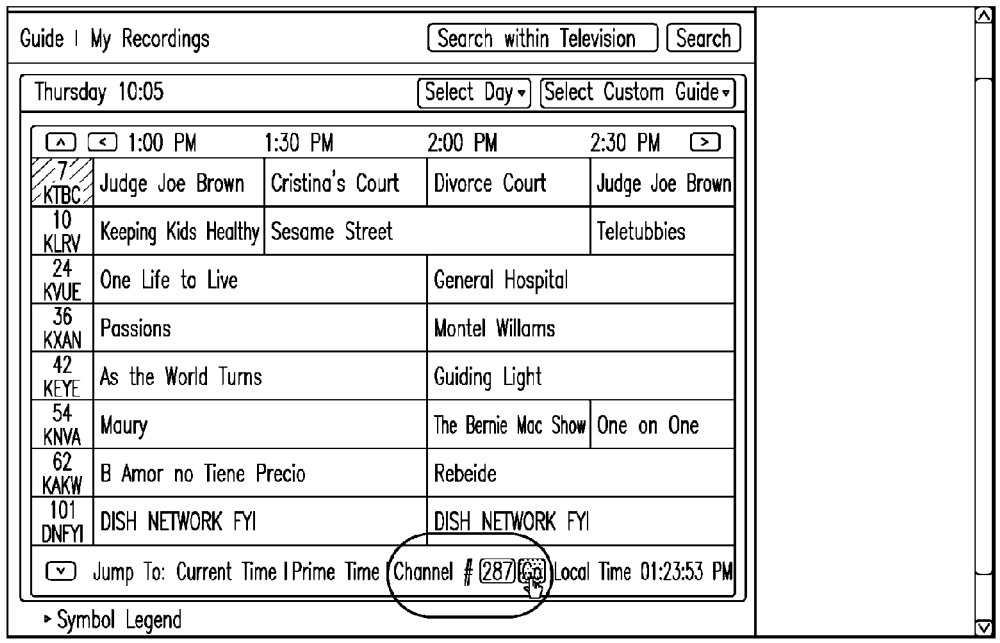
Figure 8:
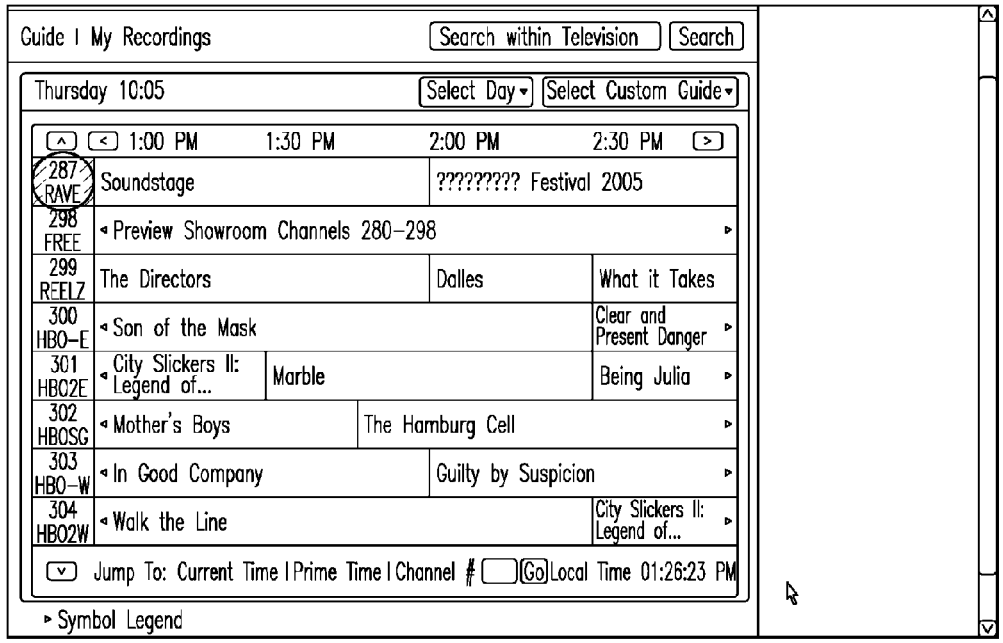
Figure 9:
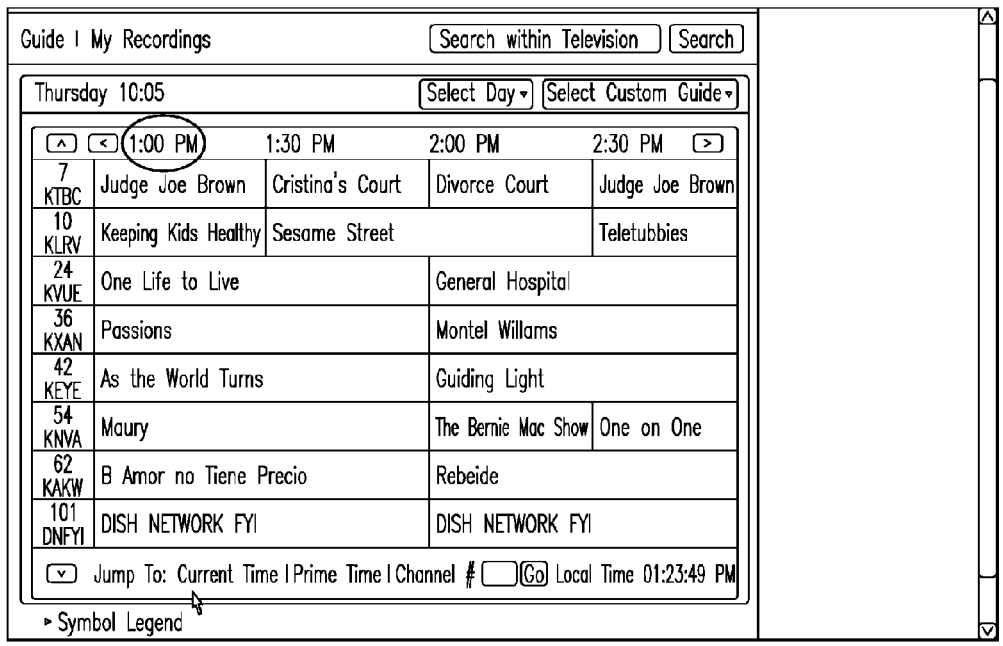
Figure 10:
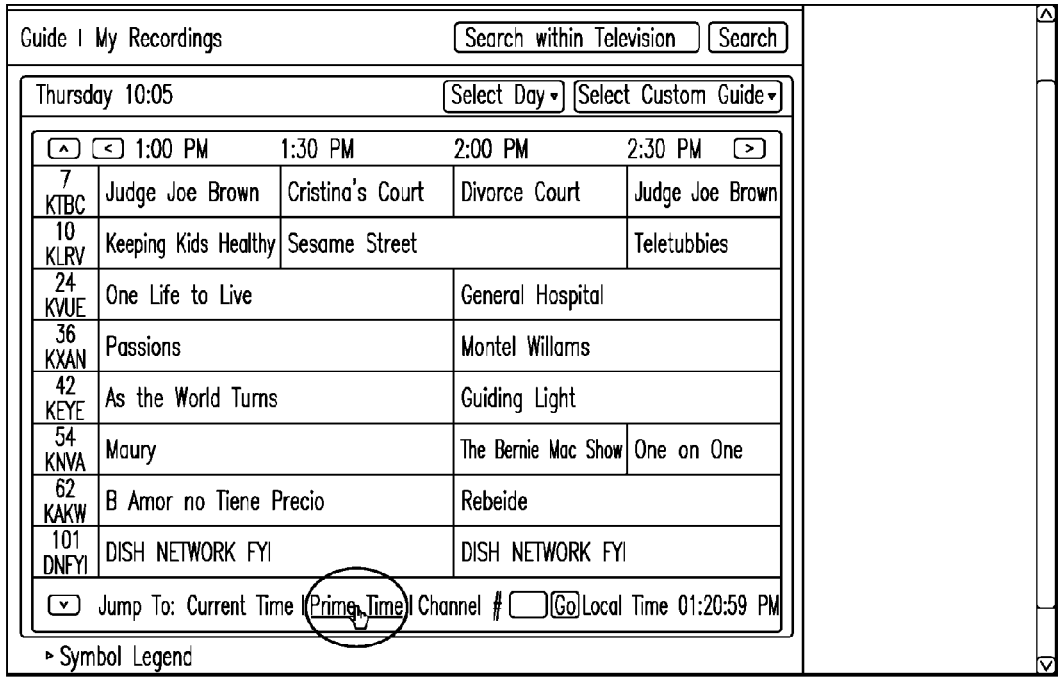
Figure 11:
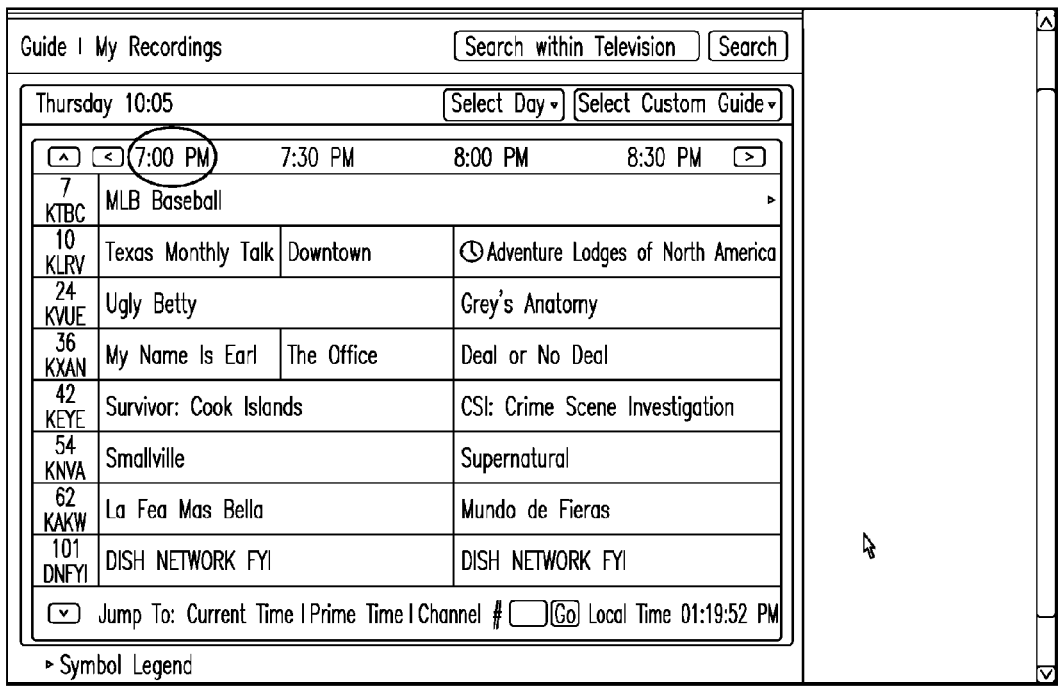
Figure 12:
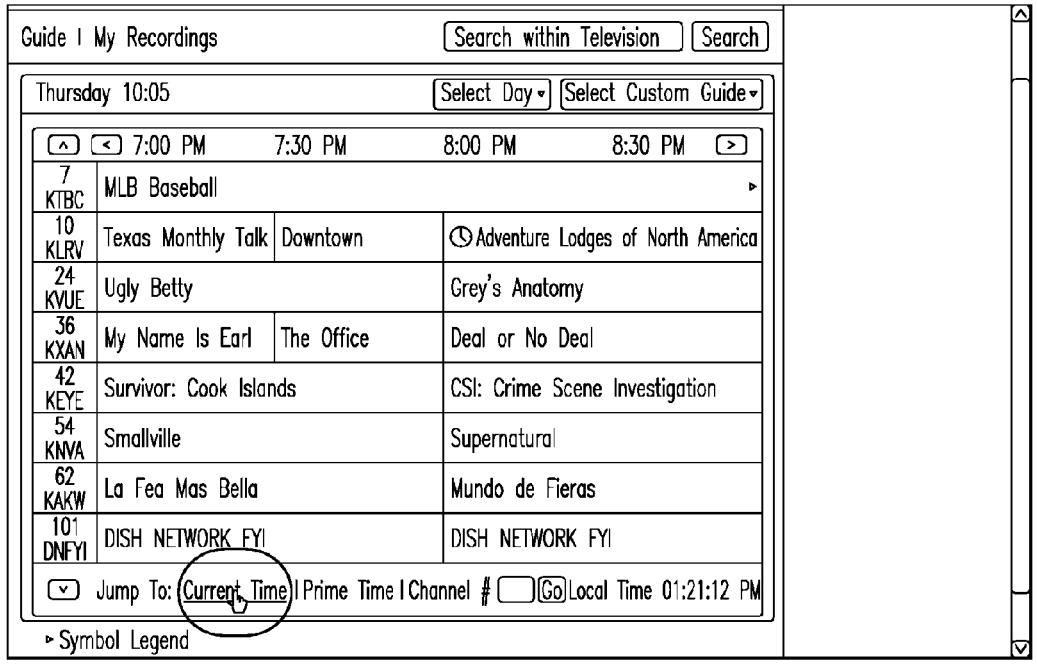
Figure 13:
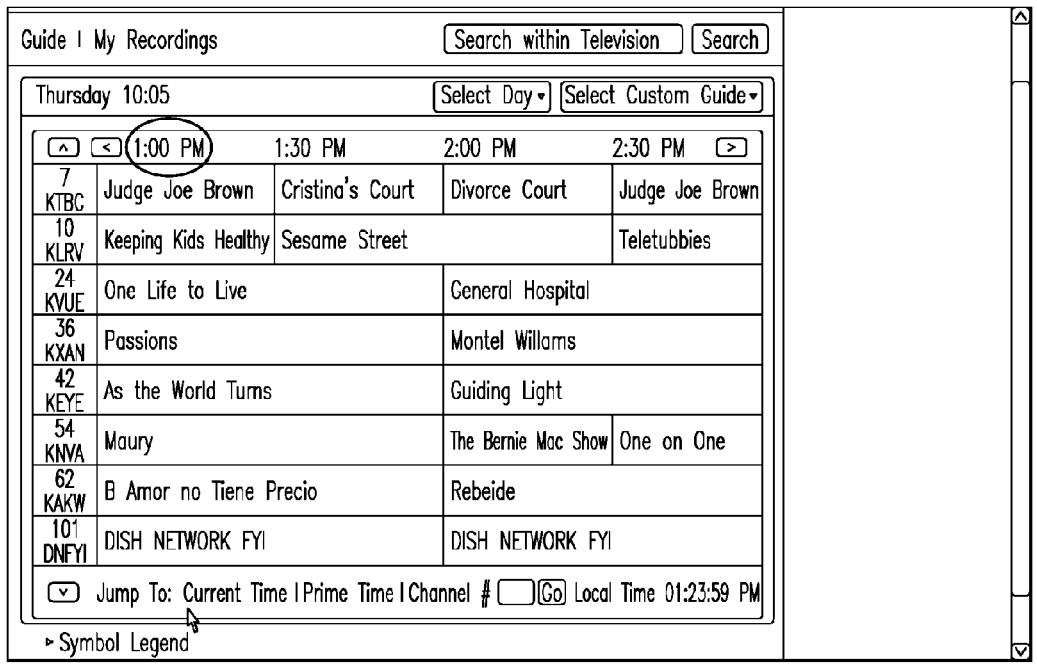
Figure 14:
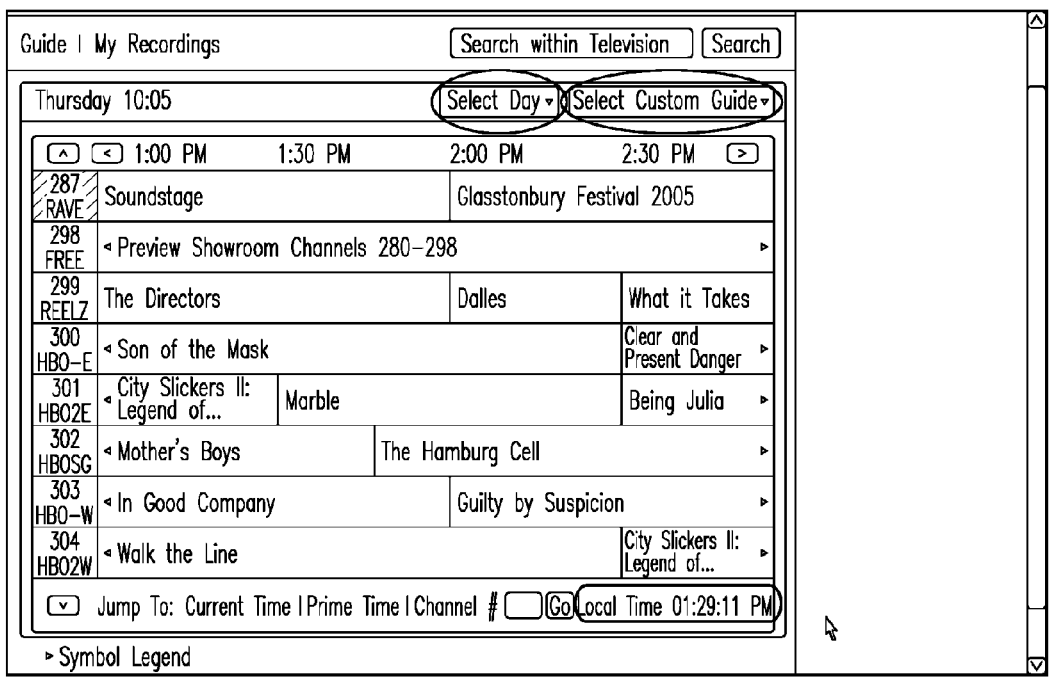

In another embodiment, the slideable canvas of the EPG can be panned by entering a channel number to jump to a portion of the EPG displaying said channel and channels above and below said channel (see FIG. 7). Alternatively, or in combination, call letters of the channel number can also be entered. In yet another embodiment, the slideable canvas can be panned from current time viewings (e.g., 1 pm—see FIG. 9) to prime time viewings (e.g., 7 pm—see FIGS. 10-11) and back (see FIGS. 12-13). In another embodiment, the slideable canvas can be panned by selecting a day of the week (or other calendar setting such a week or month) (see FIG. 14). In this embodiment, the subscriber can skip ahead in the EPG by a day or two. It would be apparent to one of ordinary skill in the art that the above panning methods can be applied singly or in combination.

Additionally, the subscriber can switch between customized EPGs with a drop-down menu (see FIG. 14) in which case the GUI window shows a slideable canvas of a new EPG that can be panned with any of the methods described above. For each of the foregoing panning methods, a current time of the satellite media receiver 106 can be presented at the bottom right of the GUI window to provide the subscriber a means to plan viewing times for DVR recordings or VoD downloads (see FIG. 14) while in transit in different time zones. It should also be noted that media programs can be selected from the slideable canvas of the EPG for viewing purposes. Thus while remotely browsing the slideable canvas of the EPG, a subscriber can point a navigation symbol (e.g., arrow) to a select media program of interest (e.g., Nickelodeon), "double-click" on the media program to direct the portal 230 to present the selected media program to the portable communication device 116 as streamed data supplied by the satellite media receiver 106.

Figure 15:
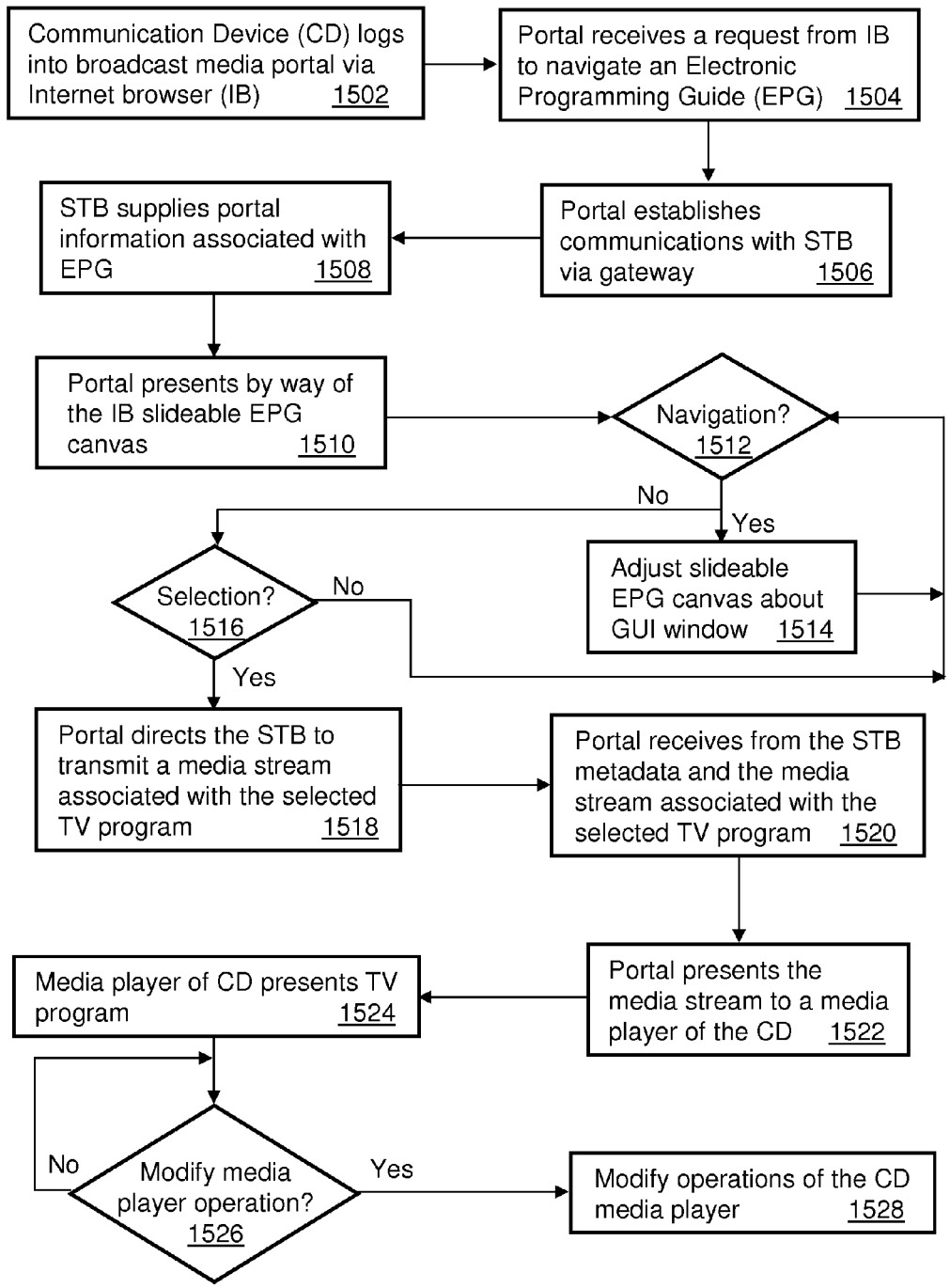
FIG. 15 depicts an exemplary method operating in portions of the satellite communication system.

FIG. 15 depicts an exemplary method 1500 operating in portions of the communication system 100. Method 400 begins with step 1502 in which a portable communication device 116 roaming the communication system 100 of FIG. 1 (e.g., a cell phone or lap top) logs into a broadcast media portal 230 via an Internet browser. The computing devices 130 operate as a web server of the broadcast media portal serving a multiplicity of subscribers of the satellite communication system depicted in FIG. 1. The portal 230 can be accessed by common means (e.g., URL) and a subscriber account identified by a user's login information (e.g., username and password).

Once a subscriber has logged in, the portal 230 can be programmed to detect in step 1504 a request from the Internet browser 301 to navigate an EPG accessible by the satellite media receiver 106. The request can arise from a selection of a GUI element presented by the portal 230 (e.g., a hypertext link or icon associated with the satellite STB for accessing an EPG) which is presented when the user logs into the portal 230 in step 1502. In response to said request, the portal 230 can be programmed in step 1506 to establish communications with the satellite STB 106 by way of the gateway 104 using a unicast channel of the satellite communication system of FIG. 1. In this step, the portal 230 can supply authentication information to the gateway 104 to provide secure access to the satellite STB 106.

Figure 3:
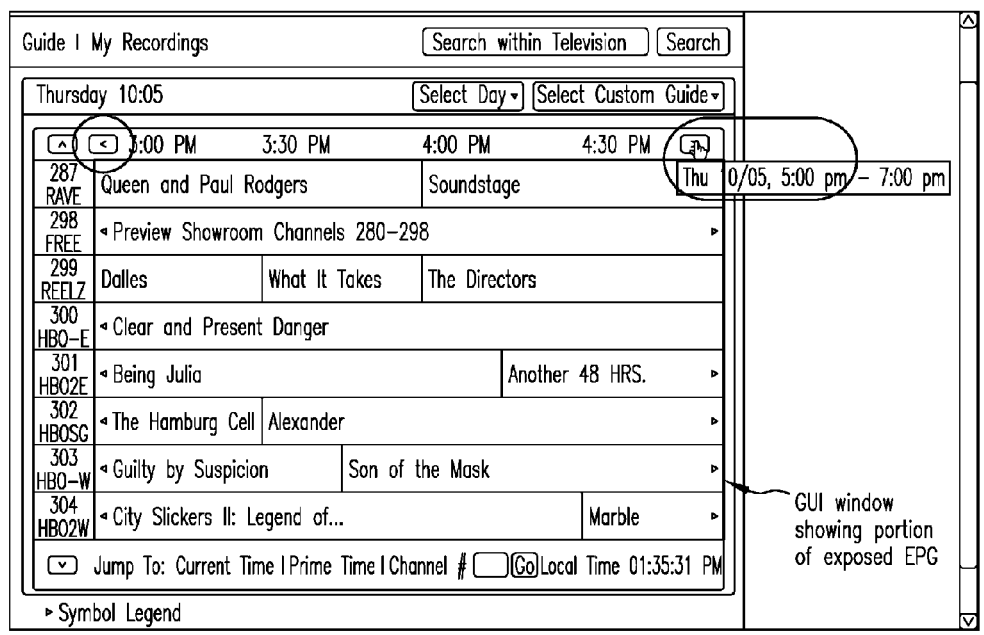
Figure 4:
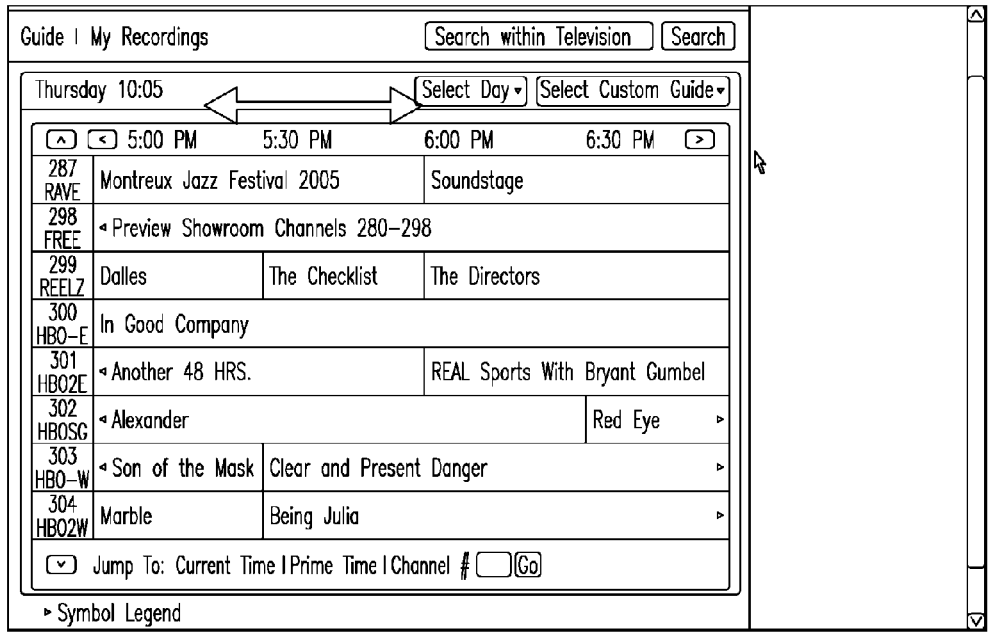
Figure 5:
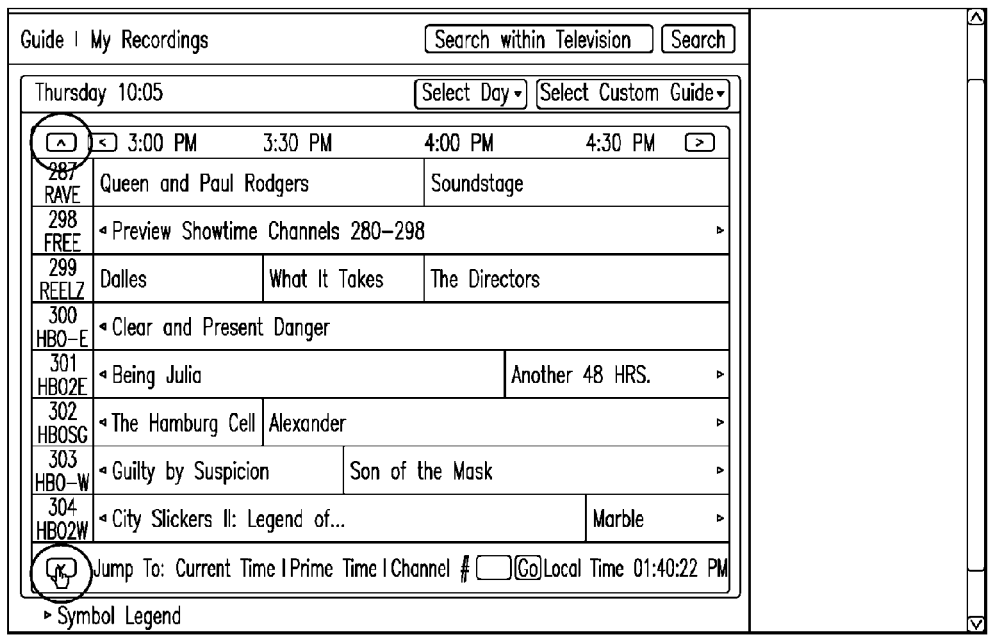
Figure 6:
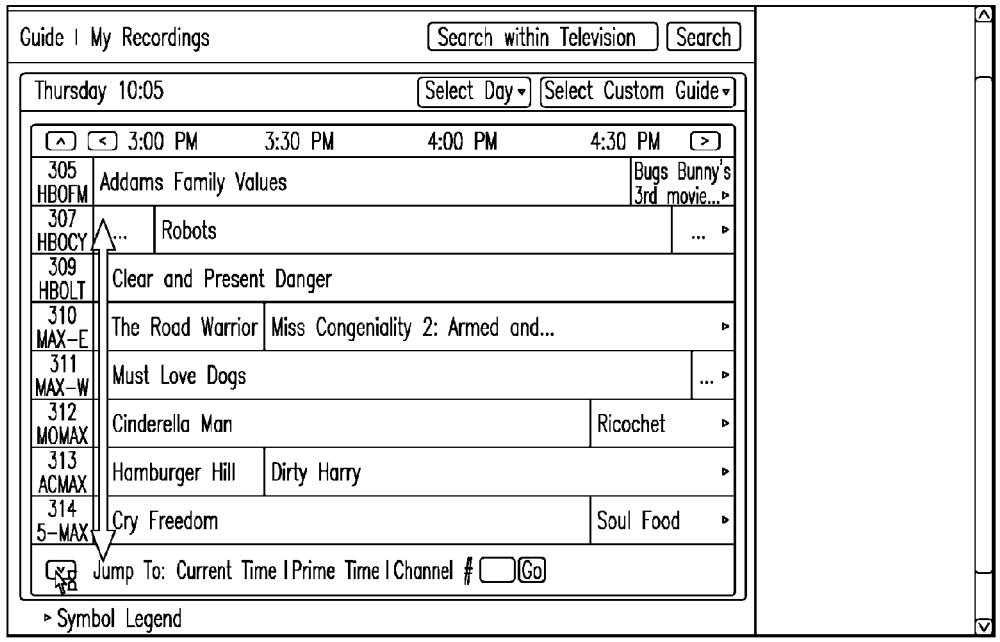

In step 1508, the Internet browser 301 receives information in for example HTML format from the portal 230 for presenting in step 1510 the slideable canvas of the EPG by way of the GUI window of FIG. 3. The portal 230 can monitor for a navigation instruction associated with the EPG from the Internet browser 301 in step 1512. When a navigation instruction is detected, the portal 230 proceeds to step 1514 to direct the satellite STB to adjust the slideable EPG canvas about the GUI window as described earlier. If the portal 230 detects something other than a navigation instruction, the portal 230 proceeds to step 1516. In step 1516 the portal 230 determines if a selection request has been made. If a selection is detected (e.g., double-click signal from a navigation element of the portable communication device 116), the portal 230 can determine if the selected item involves a media file that can be streamed to the subscriber's communication device 116. If for example the selected item is a TV program selected from the EPG that can be streamed, the portal 230 proceeds to step 1518; otherwise, the portal 230 proceeds back to step 1512.

If a streaming application can be invoked, the portal 230 proceeds to step 1518 where it directs the satellite STB 106 to transmit a media stream associated with the selected TV program accessible by said satellite STB. In step 1520 the portal 230 receives from the satellite STB 106 metadata (if available) of the TV program and the media stream associated therewith. In step 1522, the portal 230 presents the media stream to a media player of the communication device 116 (e.g., Microsoft Windows Media Player™). The presentation can take place in step 1524 by way of a graphical user interface (GUI) window of the media player that can include among other things a video or still image presentation with text derived from the metadata (e.g., name of video, song, genre, actor names, media duration, media file date, etc.).

The communication device 116 can be programmed in step 1526 to modify in step 1528 the operation of the media player when detecting a selection associated with the GUI control elements (e.g., play, pause, fast forward, volume control, etc.). The media player can be programmed to buffer the media stream received from the portal 230 and begin the presentation immediately or upon selecting the play button. Selecting the pause button ceases presentation of the streamed media. Other buttons of the media player can perform well known functions.

Upon reviewing the aforementioned embodiments, it would be evident to an artisan with ordinary skill in the art that said embodiments can be modified, reduced, or enhanced without departing from the scope and spirit of the claims described below. For example, the GUI window can be adapted with additional GUI control elements to zoom in and out of the slideable EPG canvas. In this embodiment, as a subscriber zooms out of an EPG canvas, the GUI window shows a smaller print with a greater viewable portion of the slideable EPG canvas. Similarly, as the subscriber zooms into the EPG canvas, the print of the EPG becomes larger and the GUI window presents less of the slideable EPG canvas. Additionally, method 1500 can be modified so that instead of the satellite STB 106 streaming a media file to the portal 230, the media file is retrieved by the portal from the satellite STB and processing resources of the portal are used to stream the media file to the communication device 116.

These are but a few examples of modifications that can be applied to the present disclosure without departing from the scope of the claims. Accordingly, the reader is directed to the claims section for a fuller understanding of the breadth and scope of the present disclosure.

Figure 16:
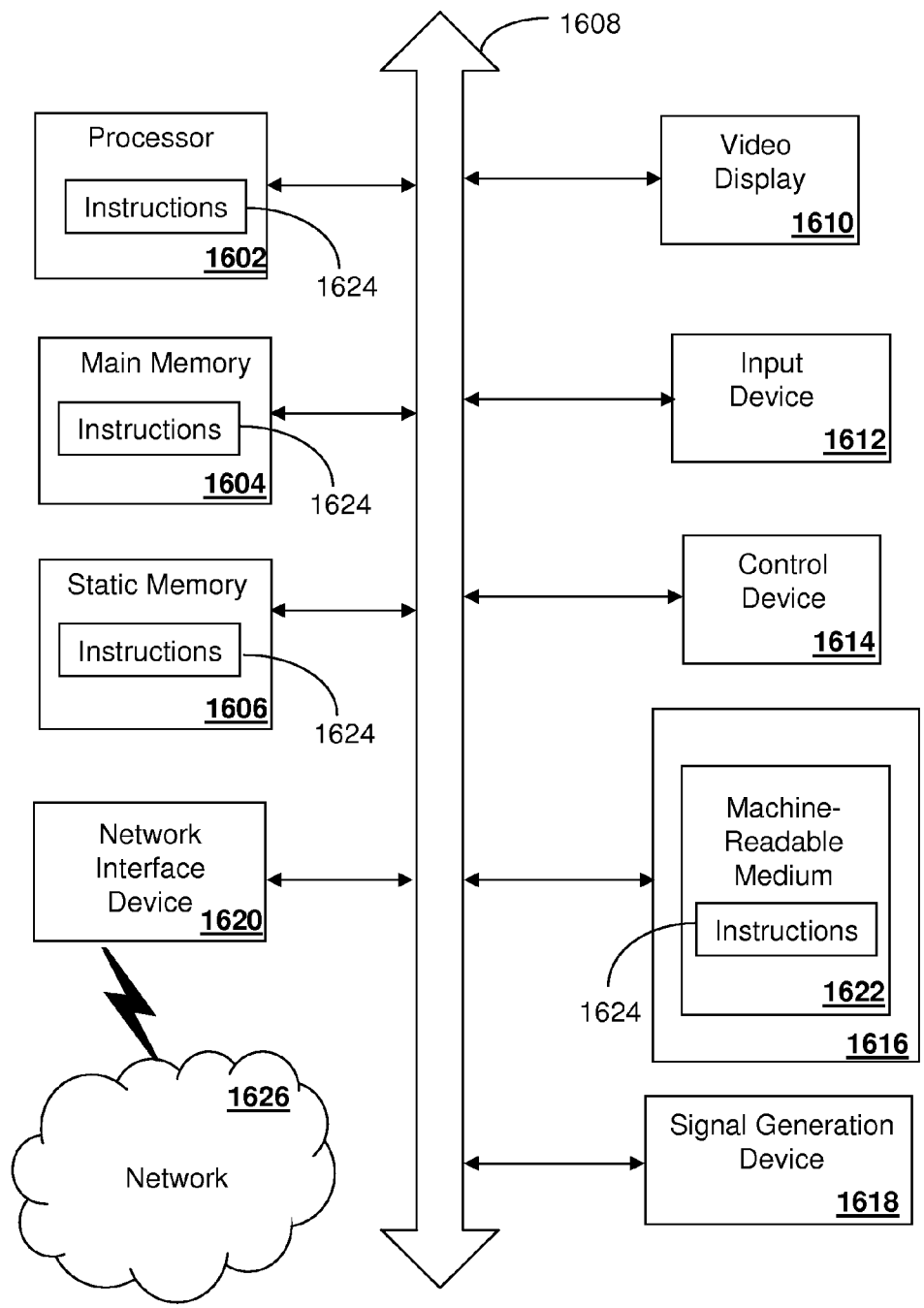
FIG. 16 is a diagrammatic representation of a machine in the form of a computer system within which a set of instructions, when executed, may cause the machine to perform any one or more of the methodologies discussed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, or parallel processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, which when executed by a processor of a portal, causes the processor to perform operations comprising:

receiving, by the portal, a request from a communication device to access an electronic programming guide of a satellite media receiver, the communication device being remote from the satellite media receiver;

establishing, by the portal, communications with the satellite media receiver by way of a gateway over a unicast channel, wherein the gateway is coupled to a broadband port of the satellite media receiver by way of a local area network managed by the gateway, wherein the satellite media receiver comprises a satellite port for receiving satellite signals supplied by a satellite communication system, and wherein the satellite signals are associated with satellite media services of the satellite communication system;

providing, by the portal, authentication information to the gateway to provide secure access to the satellite media receiver;

receiving, by the portal, first information from the satellite media receiver, the first information associated with the electronic programming guide;

presenting, by the portal, a graphical user interface window to the communication device based on the first information corresponding to a first portion of a slideable canvas of the electronic programming guide in an Internet browser of the communication device, wherein the graphical user interface window includes a local time from which the satellite media receiver is operating without regard to a current time zone of the communication device;

receiving, by the portal, from the communication device a request to pan the slideable canvas according to call letters of a channel number;

transmitting, by the portal, the request to pan the slideable canvas to the satellite media receiver;

responsive to the request to pan, receiving, by the portal, from the satellite media receiver second information associated with the electronic programming guide;

presenting, by the portal, the graphical user interface window to the communication device based on the second information corresponding to a second portion of the slideable canvas representing a panned view of the slideable canvas;

detecting, by the portal, a selection of a media program from the second portion of the slideable canvas of the electronic programming guide presented by the communication device;

retrieving, by the portal, the selected media program from the satellite media receiver; and streaming, by the portal, the media program from the portal to the communication device.

2. The non-transitory computer-readable storage medium of claim 1, wherein the graphical user interface window is defined by the portal according to a Hypertext Markup Language.

3. The non-transitory computer-readable storage medium of claim 1, wherein responsive to executing the computer instructions, the processor of the portal performs operations comprising presenting in the slideable canvas a matrix of the electronic programming guide comprising a plurality of media program channels IDs, a corresponding plurality of media programs for each media program channel, and a viewing time for each of the plurality of media programs.

4. The non-transitory computer-readable storage medium of claim 1, wherein responsive to executing the computer instructions, the processor of the portal performs operations comprising detecting the request from a selection and drag of the slideable canvas by a navigation element of the communication device.

5. The non-transitory computer-readable storage medium of claim 1, wherein responsive to executing the computer instructions, the processor of the portal performs operations comprising presenting at the graphical user interface window a plurality of graphical user interface control elements for panning the slideable canvas.

6. The non-transitory computer-readable storage medium of claim 5, wherein the plurality of graphical user interface control elements comprise a pan right graphical user interface button for panning the slideable canvas to a left, a pan left graphical user interface button for panning the slideable canvas to a right, a pan up graphical user interface button for panning the slideable canvas down, and a pan down graphical user interface button for panning the slideable canvas up.

7. The non-transitory computer-readable storage medium of claim 1, wherein responsive to executing the computer instructions, the processor of the portal performs operations comprising zooming in or out of the slideable canvas.

8. The non-transitory computer-readable storage medium of claim 1, wherein responsive to executing the computer instructions, the processor of the portal performs operations comprising:

directing the satellite media receiver to transmit a media stream associated with the selected media program; and presenting the media stream associated with the media program at the Internet browser of the communication device.

9. The non-transitory computer-readable storage medium of claim 1, wherein responsive to executing the computer instructions, the processor of the portal performs operations comprising:
presenting a graphical user interface element that presents a plurality of selectable electronic programming guides;
receiving a selection associated with the plurality of selectable electronic programming guides; and
replacing the slideable canvas of the electronic programming guide with a new slideable electronic programming guide canvas.

10. The non-transitory computer-readable storage medium of claim 1, wherein responsive to executing the computer instructions, the processor of the portal performs operations comprising:
presenting a graphical user interface element that presents a plurality of selectable days of a week;
receiving a selection associated with the plurality of selectable days; and
adjusting the slideable canvas of the electronic programming guide according to the selection.

11. The non-transitory computer-readable storage medium of claim 1, wherein responsive to executing the computer instructions, the processor of the portal performs operations comprising:
presenting a prime time graphical user interface element;
detecting a selection of the prime time graphical user interface element; and
providing the satellite media receiver with instructions to adjust the slideable canvas of the electronic programming guide to provide an adjusted slideable canvas that displays prime time viewings of media programs.

12. The non-transitory computer-readable storage medium of claim 1, wherein responsive to executing the computer instructions, the processor of the portal performs operations comprising:
presenting a current time graphical user interface element;
detecting a selection of the current time graphical user interface element; and
providing the satellite media receiver with instructions to adjust the slideable canvas of the electronic programming guide to provide an adjusted slideable canvas that displays current time viewings of media programs.

13. The non-transitory computer-readable storage medium of claim 1, wherein responsive to executing the computer instructions, the processor of the portal performs operations comprising:
presenting a channel number graphical user interface window;
detecting an entry of a channel number in the channel number graphical user interface window; and
adjusting the slideable canvas of the electronic programming guide to display in the graphical user interface window a portion of the slideable canvas associated with the channel number entered.

14. The non-transitory computer-readable storage medium of claim 1, wherein the satellite communication system comprises a broadcast satellite transmitting the satellite signals to the satellite communication system.

15. A satellite media receiver, comprising:
a memory having computer instructions;
a controller element coupled with the memory, wherein executing the computer instructions causes the controller element to perform operations comprising:
transmitting to a portal over a unicast channel first information associated with an electronic programming guide, wherein the portal processes the first information to present a graphical user interface window corresponding to a first portion of a slideable canvas of the electronic programming guide in an Internet browser of a communication device requesting the electronic programming guide, the graphical user interface window including a local time from which the satellite media receiver is operating without regard to a current time zone of the communication device, and the communication device being remote from the satellite media receiver;
receiving from the portal a request originated at the communication device to pan the slideable canvas according to call letters of a channel number;
responsive to the request to pan, generating second information associated with the electronic programming guide according to the call letters, wherein the second information enables presentation by the communication device of a second portion of the slideable canvas representing a panned view of the slideable canvas;
providing the second information to the portal;
receiving a request from the portal for a media program responsive to the portal detecting a selection of the media program from the second portion of the slideable canvas of the electronic programming guide, wherein said selection is generated by the communication device;
retrieving the media program; and
transmitting the media program and available related metadata to the portal, wherein the portal processes the media program and available related metadata resulting in a processed media program received from the satellite receiver, and streams the processed media program to the communication device.

16. The satellite media receiver of claim 15, wherein the slideable canvas corresponds to a matrix comprising a plurality of media program channels IDs, a corresponding plurality of media programs for each media program channel, and a viewing time for each of the plurality of media programs.

17. The satellite media receiver of claim 15, wherein the graphical user interface window enables selection of one of a pan up request, a pan down request, a pan right request, a pan left request, a pan to a prime time viewing request, a pan to a current time viewing request, a pan to a select channel request, or a pan to a select day request.

18. The satellite media receiver of claim 15, wherein executing the computer instructions causes the controller element to perform operations comprising transmitting to the portal information associated with a new electronic programming guide responsive to another request to present a different electronic programming guide, wherein the portal presents in the graphical user interface window a slideable canvas of the new electronic programming guide.

19. A gateway, comprising:
a memory having computer instructions; and
a controller element coupled with the memory, wherein executing the computer instructions causes the controller element to perform operations comprising:
receiving from a portal authentication information;
responsive to validating the authentication information, providing over a secure unicast channel the portal access to an electronic programming guide supplied by a satellite media receiver, wherein the portal processes the information to present a graphical user interface window corresponding to a first portion of a slideable canvas of the electronic programming guide in an Internet browser of a communication device requesting the electronic programming guide, the graphical user interface window including a local time from which the satellite media receiver is operating without regard to a current time zone of the communication device, and the communication device being remote from the satellite media receiver;

receiving from the portal a request originated at the communication device to pan the slideable canvas according to call letters of a channel;

transmitting to the satellite media receiver the request to pan the slideable canvas;

receiving from the satellite media receiver second information associated with the electronic programming guide determined according to the call letters;

providing over the secure unicast channel the second information to the portal for presentation of a second portion of the slideable canvas representing a panned view of the slideable canvas;

responsive to detecting by the portal a selection of a media program from the second portion of the slideable canvas of the electronic programming guide, receiving a request from the portal to retrieve the selected media program from the satellite media receiver; and providing the media program to the portal for streaming the media program to the communication device.

20. The gateway of claim 19, wherein the slideable canvas corresponds to a matrix comprising a plurality of media program channels IDs, a corresponding plurality of media programs for each media program channel, and a viewing time for each of the plurality of media programs.

21. The non-transitory computer-readable storage medium of claim 1, wherein the portal is separated from the satellite media receiver.

22. The non-transitory computer-readable storage medium of claim 1, wherein the satellite media receiver accesses the portal, at least in part, by a uniform resource locator for transmitting the first information.

* * * * *